Dec. 14, 1943.   L. A. MEKLER   2,336,879
REACTOR
Filed July 10, 1942   3 Sheets-Sheet 1

INVENTOR
LEV A. MEKLER
BY
ATTORNEY

Dec. 14, 1943.  L. A. MEKLER  2,336,879
REACTOR
Filed July 10, 1942  3 Sheets-Sheet 2

INVENTOR
LEV A. MEKLER
BY *Lee J. Gary*
ATTORNEY

Dec. 14, 1943. L. A. MEKLER 2,336,879
REACTOR
Filed July 10, 1942 3 Sheets-Sheet 3

INVENTOR
LEV A. MEKLER
BY
ATTORNEY

Patented Dec. 14, 1943

2,336,879

UNITED STATES PATENT OFFICE 2,336,879

REACTOR

Lev A. Mekler, Washington, D. C., assignor to Universal Oil Products Company, Chicago, Ill., a corporation of Delaware Application July 10, 1942, Serial No. 450,411

15 Claims. (Cl. 257—224)

This invention relates to an improved form of heat exchange apparatus in which catalytic hydrocarbon conversion reactions may be conducted and which is especially adapted for use in dehydrogenation processes.

The features of the invention provide means for accommodating differential thermal expansion between the individual tubes of a reactor. Means are also provided for protecting the interior surfaces of the reactor from the effects of alternate oxidation and reduction reactions. These two problems have heretofore been especially important items of consideration in designing reactors to be employed in dehydrogenation processes. To illustrate the utility and advantages of the invention herein provided, a process for catalytically dehydrogenating butanes will be briefly described.

The process of catalytically dehydrogenating butanes is usually conducted in a reactor of the heat exchange type employing a plurality of relatively small tubes as reaction zones. Solid granular dehydrogenating catalyst is disposed within these tubes and means are provided for supplying reactants thereto and removing the resulting conversion products therefrom. The apparatus is also constructed with means for directing convective fluid about the tubes to supply heat thereto for the endothermic dehydrogenating reaction and to remove heat therefrom during the exothermic catalyst reactivation reaction.

The temperature of this fluid when supplying heat for the endothermic reaction may be, for example, about 1500° F. at the point of its introduction to the shell and its exit temperature may be about 1200° F. During the proces of dehydrogenation a carbonaceous deposit accumulates upon the catalyst particles and, if the catalyst is not properly reactivated during each cycle, the deposit may reach proportions sufficient to retard or entirely stop the flow of reactants through some of the tubes. When the flow is thus restricted or stopped the cooling effect of the reactants on the tubes is reduced or eliminated with the result that the restricted or plugged tubes will attain a higher temperature than the other tubes of the group through which reactants continue to flow. In the case of complete stoppage of the reactants, the tube temperature will rise to closely approach that of the incoming convective fluid, say about 1300° F., while the normally functioning tubes will be maintained, for example, at a temperature of about 1125° F. Under these conditions, the difference in lengths due to thermal expansion between a normally functioning tube and a blocked tube will be about .015 inch per foot of tube length and in the absence of provision for accommodating this differential expansion, the hotter tube or tubes will bow or bulge due to the compression stresses.

The regeneration of the catalyst, that is the removal of deleterious material to render the catalyst suitable for further use, is usually accomplished by passing controlled amounts of oxygen-containing gases through the catalyst bed to cause combustion of the deleterious deposit. The temperature of the catalyst and of the tube tend to increase during regeneration. At the same time, a cool convective fluid is passed around the tubes to abstract heat liberated by the combustion and prevent overheating of the catalyst. In a plugged tube there will be no flow of the oxygen containing gases and no combustion and the tube will therefore, be cooled to a much lower temperature than the normally functioning tubes and will be subject to tension because of the resultant differential thermal expansion between the tubes.

During the above mentioned regenerating period the oxygen contained in the regenerating gases will tend to oxidize the metal surfaces with which it comes in contact to form an oxide film thereupon. With continuous flow of the oxygen containing gases the oxide film formed normally acts as a protective film against further oxidation. With cyclic regenerating and processing periods, however, this film is constantly reduced so that the surface exposed to the alternate oxidation and reduction soon acquires a sponge like structure which is less resistant to oxidation than the original comparatively smooth surface. The oxides no longer forming a continuous film are eventually carried by the streams into the catalyst where they may act not only as a mechanical obstruction but also as a parasitic catalyst.

It has previously been disclosed that an alloy comprising 25–30% chromium and being substantially devoid of nickel will resist the above mentioned oxidation and reduction reactions. The features of my invention provide means for efficiently using this special alloy as a protection for the main metal used and at the same time to accommodate for any differential expansion between the various tubes.

In order to make the features and advantages of the invention more apparent and clearly understood, reference is made to the accompanying diagrammatic drawings and the following description thereof.

Figure 1:
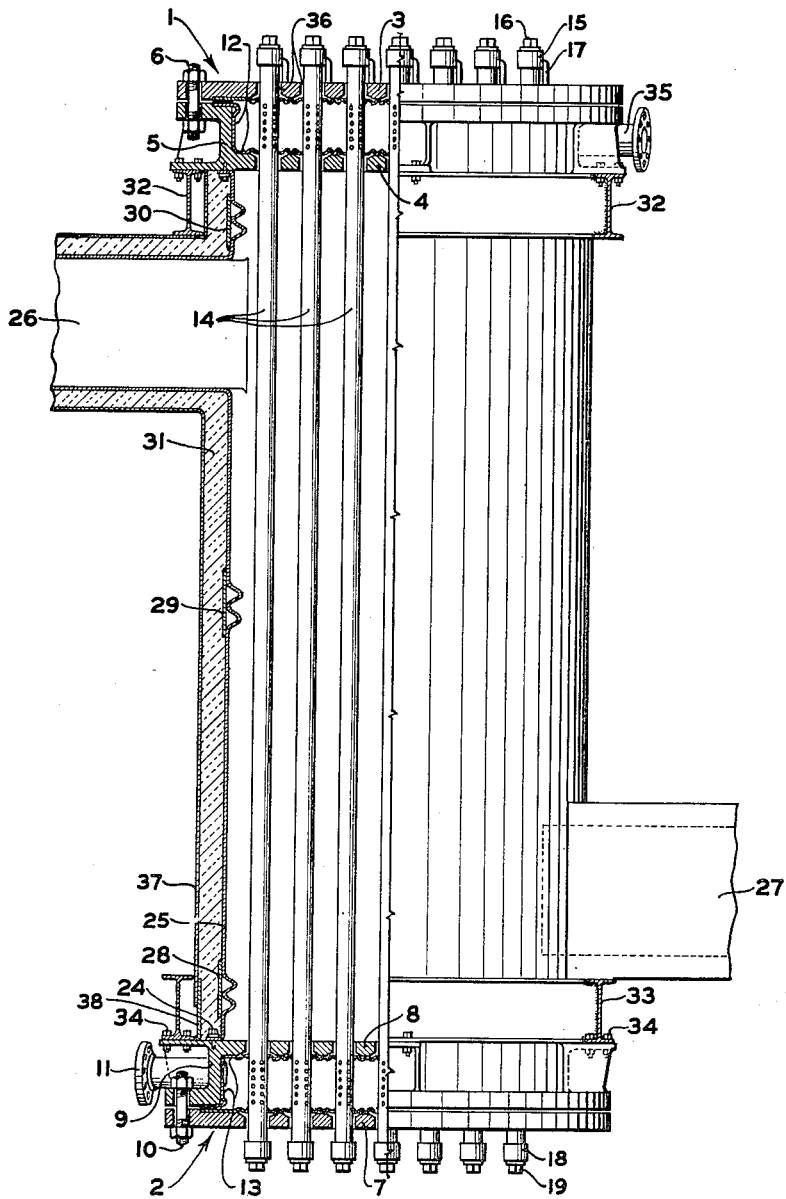
Fig. 1 shows, partially in section, an elevational view of a reactor embodying the features of the invention.
Figure 2:
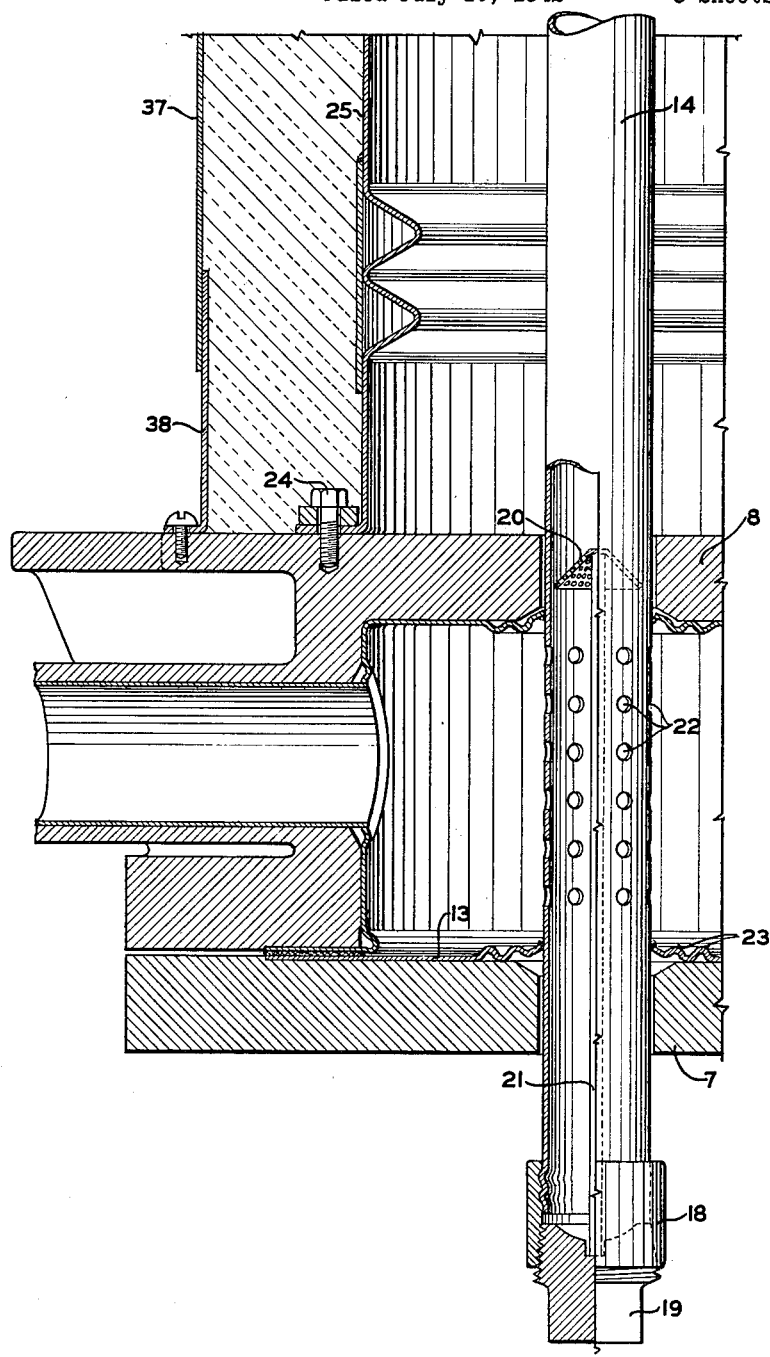
Fig. 2 shows an enlarged detail largely in section of the lower end of one of the tubes and a portion of the lower header compartment of the reactor shown in Fig. 1.
Figure 4:
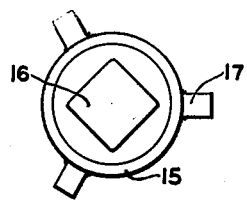
Fig. 4 is a plan view of the tube shown in Fig. 3.

Referring now to the drawings, the apparatus here illustrated comprises spaced header compartments 1 and 2. Header compartment 1 is made up of spaced tube sheets 3 and 4 and a cylindrical wall 5 which is integral with the tube sheet 4. The cylindrical wall 5 is provided with a flange portion to which tube sheet 3 may be secured by a plurality of suitable bolts 6, and also has a flanged nozzle 35. Header compartment 2 is similar to header compartment 1 and comprises spaced tube sheets 7 and 8 and cylindrical wall 9. Cylindrical wall 9 is provided with a flanged portion to which tube sheet 7 may be secured by means of bolts 10, and is also provided with a flanged nozzle 11. The header compartments 1 and 2 are provided adjacent their inner surfaces with relatively thin linings 12 and 13 respectively, the purpose of which is to prevent contacting of the structural portions of the headers by reactant materials. The nozzles 35 and 11 communicate with the spaces defined by linings 12 and 13 respectively and, depending upon the desired direction of flow through the tubes, may be utilized as either inlet or outlet nozzles.

Extending between and through ports in the tube sheets are a plurality of tubular fluid conduits 14, the linings 12 and 13 being welded thereto at the points where they are intersected thereby.

Figure 3:
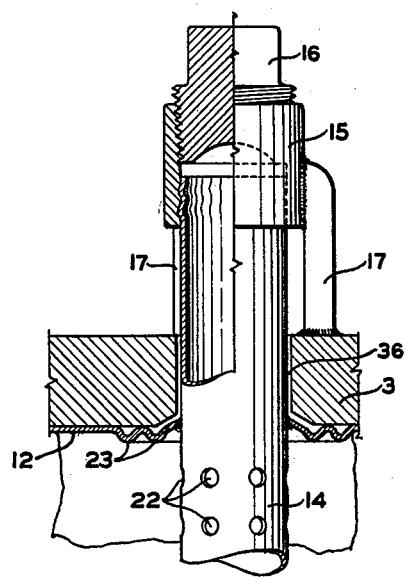
Fig. 3 shows an enlarged detail partly in section of the upper end of one of the tubes and a portion of the upper header compartment of the reactor shown in Fig. 1.

The upper ends of tubular members 14, as shown in Fig. 3, are provided with couplings 15 into which they are secured by rolling or other suitable means, and plugs 16 which are adapted to seal the end of the tube are screwed into the couplings 15. Supporting means for the individual tubes are provided, in the case here illustrated, by securing a suitable number of lugs 17 to the couplings 15 and to the tube sheet 3. The lower ends of each of the tubular elements 14 are provided with a similar closure means comprising couplings 18 into which the tubes are rolled or otherwise secured and plugs 19. The above mentioned closure couplings and removable plugs provide means for filling the tubes with the desired contact material and for the removal thereof when spent for further use.

While Fig. 1 shows the tubes in fixed position at the top and in floating position on the bottom the reverse arrangement can be used and may be preferable in many cases.

Supporting means for the catalyst or contact material which is normally disposed within the members 14 comprise a flat plate or perforate cone shaped member 20 spaced from and supported by the plug 19 by means of a suitable leg or rod 21 which may be welded to the plug or rest loosely on it. The tubular members 14 are provided with a plurality of perforations 22 in those portions thereof which come within the lined tube header compartments and thus provide communication means therebetween.

The liners are provided with portions containing circular corrugations 23 concentric with the ports through which the tubular elements 14 project, the purpose of which will be hereinafter described.

Extending between the headers 1 and 2 and secured thereto by means of bolts 24 is a cylindrically shaped thin metal jacket 25 surrounding the nest of tubular elements 14. This jacket is provided with conduits 26 and 27 adjacent opposite ends thereof which serve as means for directing convective fluids through said jacket about said fluid conduits 14. The jacket 25 is also provided with expansible sections 28, 29 and 30 which provide means for accommodating differential thermal expansion between said jacket and the enclosed nest of tubes. The jacket or housing 25 and connecting conduits may be enclosed with suitable insulating material 31 such as, for example, asbestos, magnesia, mineral wool, glass wool, exfoliated vermiculite, or the like, to prevent loss of heat due to radiation. An outer jacket or housing comprising members 37 and 38 may be used to retain the insulating material in place. In order to provide for differential thermal expansion of the outer jacket and the tubes 14, members 37 and 38 are disposed in slidable relation with each other.

The spaced header compartments 1 and 2 must be individually supported due to the flexible sections of the jacket 25 and also to accommodate the relatively large thermal expansion of the tube nest. This may be accomplished by supporting the upper header compartment by means of structural members 32 which may be firmly anchored to a supporting structure and by suspending the structural members 33 which are attached by means of bolts 34 to the lower header compartment from suitable counter-weights or springs.

The aforementioned liners 12 and 13 although attached to the tubular elements 14 are provided with a degree of flexibility which will accommodate any differential thermal expansion or contraction due to temperature differential between any of the tubular elements, by means of their concentric corrugated portions 23. It will also be noted that while these linings are clamped in position between the respective tube sheet pairs they are preferably otherwise unsecured, or at most secured in a discontinuous manner so that they will remain flexible. The lining material need not be very thick due to the supporting effect of the main structural members of the tube headers and the relatively low pressures normally employed.

I claim as my invention:

1. A heat exchange apparatus comprising in combination spaced headers, relatively thin flexible linings positioned within each header, a plurality of tubular fluid conduits extending between said headers and secured to the linings therein, a shell extending between said headers and defining a chamber within which said tubular fluid conduits are disposed, communication means between said conduits and a compartment within each header defined by its lining, and circular corrugations in said linings surrounding each of said tubular conduits for accommodating differential expansion and contraction between individual tubular fluid conduits.

2. A heat exchange apparatus comprising in combination spaced headers, relatively thin flexible linings discontinuously secured within each header, a plurality of tubular fluid conduits extending between said headers and secured to the linings therein, a shell extending between said headers and defining a chamber within which said tubular fluid conduits are disposed, means for accommodating differential expansion and contraction between individual tubular fluid conduits, and communication means between said conduits and a compartment within each header defined by said linings.

3. A heat exchange apparatus comprising in combination spaced headers, relatively thin flexible linings discontinuously secured within each header, a plurality of tubular fluid conduits extending between and through said headers and secured to only the linings therein, a shell extending between said headers and defining a chamber within which said tubular fluid conduits are disposed and communication means between said conduits and a compartment within each header defined by its lining.

4. A heat exchange apparatus comprising in combination spaced headers, relatively thin flexible linings within each header, a plurality of tubular fluid conduits extending between and through said headers and secured to the linings therein, a shell extending between said headers and defining a chamber within which said tubular fluid conduits are disposed, means for accommodating differential expansion and contraction between individual tubular fluid conduits, and communication means between said conduit and a compartment within each header defined by its lining.

5. A heat exchange apparatus comprising in combination spaced headers, relatively thin linings within each header, a plurality of tubular fluid conduits extending between and through said headers and secured to the linings therein, a shell extending between said headers and defining a chamber within which said tubular fluid conduits are disposed, means for accommodating differential expansion and contraction between individual tubular fluid conduits, and communication means between said conduits and a compartment within each header defined by its lining, said expansion and contraction accommodation means comprising corrugations in the linings surrounding each individual tubular element.

6. A heat exchange apparatus comprising in combination spaced headers, relatively thin linings within each header, a plurality of tubular fluid conduits extending between and through said headers and secured to the linings therein, a shell extending between said headers and defining a chamber within which said tubular fluid conduits are disposed, means for accommodating differential expansion and contraction between individual tubular fluid conduits, and communication means between said conduits and a compartment within each header defined by its linings, said expansion and contraction accommodation means comprising concentric corrugations in the linings surrounding each individual tubular element.

7. A heat exchange apparatus comprising in combination spaced headers, relatively thin linings within each header, a plurality of tubular fluid conduits extending between and through said headers and secured to only the linings therein, a shell extending between said headers and defining a chamber within which said tubular fluid conduits are disposed, closure means for the ends of said conduits, and communication means between said conduits and a compartment within each header defined by its lining.

8. A heat exchange apparatus comprising in combination spaced headers, relatively thin linings within each header, a plurality of tubular fluid conduits extending between and through said headers and secured to only the linings therein, a shell extending between said headers and defining a chamber within which said tubular fluid conduits are disposed, closure means for the ends of said conduits, the closure means for the upper ends of said conduits embodying supporting means therefor, means for accommodating differential expansion and contraction between individual tubular fluid conduits, and communication means between said conduits and a compartment within each header defined by its lining.

9. A heat exchange apparatus comprising in combination spaced headers, relatively thin linings within each header, a plurality of tubular fluid conduits extending between and through said headers and secured to only the linings therein, a shell extending between said headers and defining a chamber within which said tubular fluid conduits are disposed, closure means for the ends of said conduits, the closure means for the upper ends of said conduits embodying supporting means therefor, means for accommodating differential expansion and contraction between individual tubular fluid conduits, and communication means between said conduits and a compartment within each header defined by its lining, said expansion and contraction accommodation means comprising circular corrugations in the linings surrounding each individual tubular element.

10. The apparatus described in claim 4 wherein the tubular elements are secured at one end to one of said headers.

11. The apparatus described in claim 5 wherein said tubular elements are secured at one end to one of said headers.

12. The apparatus described in claim 4 wherein said tubular elements are secured at their upper ends to one of said headers.

13. The apparatus described in claim 5, wherein said tubular elements are secured at their upper ends to one of said headers.

14. The apparatus described in claim 4 wherein said tubular elements are secured at their lower ends to one of said headers.

15. The apparatus described in claim 5 wherein said tubular elements are secured at their lower ends to one of said headers.

LEV A. MEKLER.